Nov. 26, 1957     I. SHUR     2,814,325
NUT WITH MOVING SEGMENTS WHICH
ARE SIMULTANEOUSLY ACTUATED
Filed Feb. 25, 1955

INVENTOR
IRA SHUR

BY

ATTORNEY

United States Patent Office 2,814,325
Patented Nov. 26, 1957

2,814,325

NUT WITH MOVING SEGMENTS WHICH ARE SIMULTANEOUSLY ACTUATED

Ira Shur, Bayside, N. Y., assignor to Waldes Kohinoor, Inc., Long Island City, N. Y., a corporation of New York Application February 25, 1955, Serial No. 490,597

7 Claims. (Cl. 151—19)

This invention relates to improvements in quick-acting fasteners, and more particularly to improvements in quick-acting bolt and nut fasteners of the type disclosed in my prior application Serial No. 359,819, filed June 5, 1953.

In common with the quick-acting fastener of my prior application aforesaid, the fastener of the present application employs as the nut component thereof a frustro-conical shell or housing containing two nut halves which when brought together are adapted to form a full-round nut having complemental frustro-conical shape, said nut halves being normally maintained spread apart in the larger end of the housing by spring means reactive thereon but being positively forced into the smaller end of the housing and thereby brought together about a bolt inserted into the housing by lever means responding for its actuation to such nut insertion. The improvement in the present improved fastener over the fastener of my prior application becomes apparent when it is considered that, while performing satisfactorily, a quick-acting fastener as disclosed in my prior application requires precision manufacture for optimum results. This is explained by the fact that the spring means employed to spread the nut halves into the larger end of the housing, and against the bias of which the nut halves move axially into the smaller end of the housing, consists of two opposing spring members, each of which is affixed to one nut half only and is accordingly controlled in its action substantially exclusively by said one nut half. Obviously, such an arrangement necessitates very careful dimensioning and balancing of the two spring members if the two nut halves are to work uniformly and smoothly.

The aforesaid lever means employed to actuate the nut halves into the smaller end of the housing as aforesaid also consists of two levers, each individual to a nut half, so that the same problem of precise dimensioning and balancing of the levers arises in respect thereto as with the nut-spreading springs. Finally, the automatic bolt ejecting means of a fastener according to my prior application left much to be desired in terms of uniformity and positiveness of action.

Broadly stated, an object of the present invention is to improve a quick-acting bolt and nut fastener according to my prior application in respect not only to simplifying its manufacture, but also to rendering its performance more positive and uniform.

A further and more detailed object of the invention is the provision of a quick-acting bolt and nut fastener of the same general type as is disclosed in my prior application aforesaid, but which is characterized by a simplified re-arrangement of the spring and lever means for normally maintaining the nut halves in the larger end of the housing and for forcing them into the smaller end of the housing, respectively, which enables the fastener to be manufactured more economically and insures that its action is uniform and positive throughout its life.

Yet another object of the invention is the provision of a quick-acting bolt and nut fastener of the stated character which employs as the spring means for normally maintaining the nut halves spread in the large diameter end of the housing two symmetrically disposed springs, each of which is reactive on both nut halves, rather than being individual to one nut half only as in my prior fastener.

A further object of the invention is the provision of a quick-acting bolt and nut fastener characterized by spring means constructed and functioning as aforesaid, which may take the form of two separate springs, or of a single spring unit combining two such springs and which performs in the same manner as the two separate springs.

Yet another object of the invention is the provision of a quick-acting bolt and nut fastener as above stated which employs as the lever means for forcing the nut halves into the smaller end of the nut housing responsively to insertion of the bolt into said housing two symmetrically disposed levers, each of which is arranged so as to be effective on both of the nut halves rather than being individual to one nut half only, as in my prior fastener.

A further object of the invention is the provision of a quick-acting bolt and nut fastener as aforesaid characterized by the incorporation therein of positive means for ejecting the bolt from the housing following disengagement of the nut halves therefrom.

More specifically, it is an object of the invention to provide a quick-acting bolt and nut fastener of the last stated character, wherein the bolt ejection means consists of a helical spring constructed and arranged so as to be highly effective in ejecting the bolt from the housing, following disengagement of the nut halves therefrom.

The above and other objects and features of advantage of a quick-acting bolt and nut fastener according to the present invention will appear from the following detailed description thereof, in which reference is had to the accompanying drawing illustrating the salient features of the improved fastener, and in which.

Figure 1:
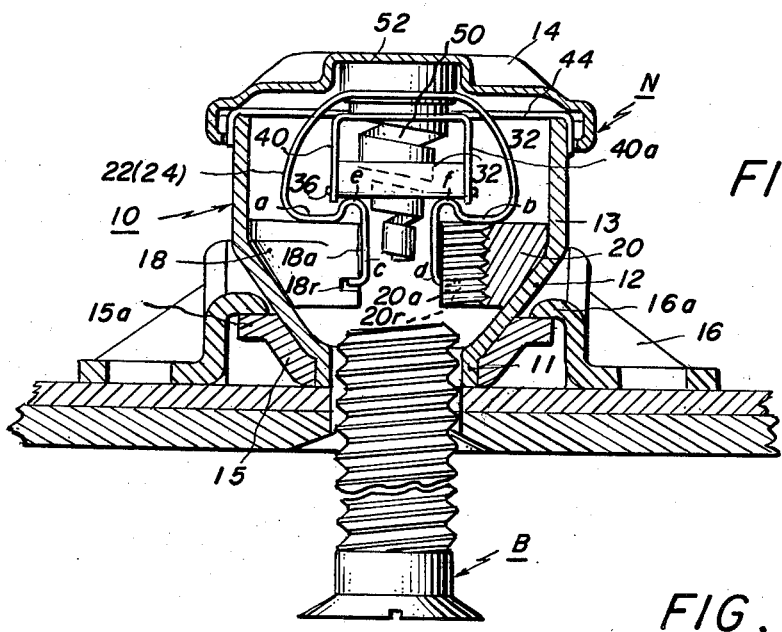
Fig. 1 is a longitudinal vertical section taken through the nut element of the fastener and illustrating the bolt in process of insertion therein.

Referring to the drawing, a quick-acting bolt and nut assembly according to the present invention employs a nut component generally designed N and including a shell or housing 10 having a small-diameter cylindrical end 11 defining an opening for the isertion of the bolt component B of said assembly, an intermediate frustro-conical portion 12 hereinafter for convenience referred to as the "tapered portion," and a large-diameter cylindrical portion 13 which is closed at its outer (upper) end by a closure cap 14. The small-diameter cylindrical end 11 and the immediately adjoining tapered portion of the housing is shown to be suitably reinforced by a permanently affixed flanged reinforcing ring 15, the flange 15a of which is adapted to be engaged and held down by the complemental flanges 16a of a base 16 by which the nut housing is secured flush against the surface of a part or sheet to be held by the fastener, which part or sheet may be the skin of an aeroplane wing or fuselage defining a cut-out or access opening thereto, or the frame of such a cut-out or access opening.

Contained within the housing 10 are two half-round nut segments or halves 18, 20 whose outer peripheries are tapered complementally to the taper of the tapered housing portion 12. The flat diametral faces 18a, 20a of the nut halves are each formed with a half-round axial bore which is threaded, the diameter of the half-round bores and the cutting of the threads being such that when the nut halves 18, 20 are brought together there is formed a substantially full-round threaded bore for the reception of the bolt B.

According to the present invention, the nut halves 18, 20 are normally maintained spread apart in the larger end of the tapered portion 12 of the housing by means of two springs designated 22, 24. As best seen in Fig. 1, each of said springs is shaped somewhat as the Greek character omega, whereby its arms function as double leaf springs and each spring is transversely arranged so that it extends between and reacts on both the nut halves 18, 20. Also, by reference to Fig. 2, the springs 22, 24 are disposed symmetrically to the sides of the vertical center line of the nut assembly as defined by the axis of the bolt opening. More in detail and as best seen in Fig. 1, springs 22, 24 each has a knob-shaped body portion of width greater than the maximum spacing between the diametral faces of the nut halves. Thus, with said body portion being contained in the larger end 13 of the nut housing, the spaced under parts *a* and *b* thereof bear on the flat upper-end surfaces of said nut halves. To provide a positive connection between each spring 22, 24 and both nut halves, said under parts *a*, *b* are connected to depending vertical leg portions *c* and *d*, via upwardly projecting humps *e* and *f*. Said legs extend downwardly into the space between and bear flush against the diametral faces of the nut halves, terminating at their free ends in offsets *g* and *h* which seat in recesses 18*r*, 20*r* provided therefor in said faces. Thus, it will be seen that the springs 22, 24 each acts on both nut halves and together impose a spreading force against the nut halves at points disposed symmetrically to the sides of the center line of the nut assembly.

Lever means functioning to positively press the nut halves into the smaller-diameter end of the tapered portion 12 of the housing are provided, it being a feature of the present invention that such lever means comprises two levers 32, 34, each of which is operative on both of the nut halves 18, 20. More particularly, said levers 32, 34 are of the bellcrank type, and they are mounted to rock on symmetrically disposed pivots or pintles 36, 38 which extend transversely across said nut halves, being journaled in pairs of arms 40, 40*a* and 42, 42*a* which extend downwardly from a plate 44 held against the upper edge of the housing 10 by the closure cap 14.

As explained in my prior application, when a bolt B is inserted into the housing 10, it engages against the inner arms of said bellcrank levers, such positively causing them to rock in unison but in opposite (downward) direction whereupon the outer arms of said lever apply a force against the upper ends of the nut halves sufficient to move them axially downwardly into the smaller end of the housing, such in turn resulting in the nut halves being brought together against the spreading force exerted thereon by the springs 22, 24. Here, rather than being individual to a nut half, each of the levers 32, 34 engages and acts on both the nut halves. Such action of each of the levers 32, 34, accompanied by minimum dimensioning of parts, is brought about by arranging said levers so that their outer arms directly overlie the humps *e*, *f* of the aforesaid springs 22, 24. Thus, as seen in Fig. 1, when the outer arms of the levers are swung downwardly, they bear on the spring humps which of course serve to transmit lever force to the nut halves 18, 20.

Figure 2:
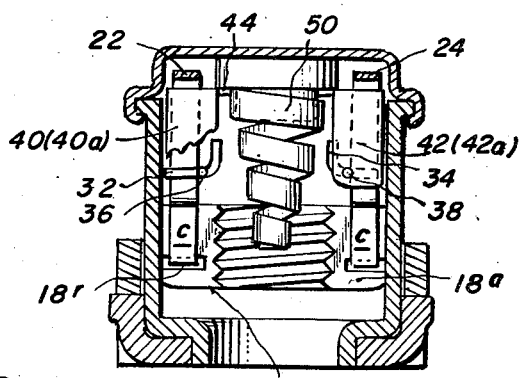
Fig. 2 is a transverse vertical section of the nut element.
Figure 3:
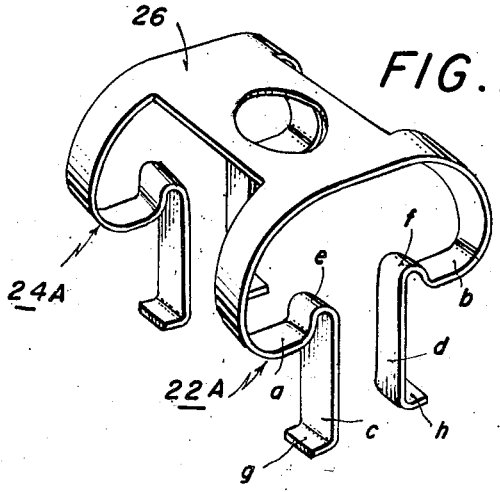
Fig. 3 is a perspective view illustrating a modified arrangement of the spring means for spreading the nut halves into the larger end of the nut housing.

While separate nut-half spreading springs 22, 24 are illustratively show n in Fig. 2, it will be understood that said springs may be combined into a single spring unit as shown in Fig. 3. In this figure, the two omega-shaped springs 22A, 24A are connected by an integral connecting bar or piece 26 into the form of a single spring unit, as aforesaid.

According to a further feature of the invention, improved means are provided for positively ejecting the bolt B from the nut housing following spreading of the nut halves 18, 20 by an amount sufficient to disengage the nut and bolt threads. Illustratively, such means comprises a helical spring 50 whose larger end is fixedly seated in a suitable recess 52 provided therefor in the cap 14 and which has sufficient axial length that its smaller end extends well into the space between the nut halves 18, 20 in the spread position of the latter. This arrangement provides that, when the bolt is inserted into the nut, its entering end engages the small-diameter end of the helical spring 50, causing same to shorten axially and thereby to store energy which it retains during the time that the bolt is held by the nut halves closing thereon. However, upon the nut halves spreading under the urge of springs 22, 24 the small amount required to disengage the threads of the nut halves from those of the bolt, as occurs when the bolt is backed off slightly, the spring 50 releases its stored energy and in so doing positively ejects the bolt from the housing.

Without further analysis, it will be appreciated that a nut assembly incorporating the improved spring and lever means for normally maintaining the nut halves spread within the larger end of the tapered nut housing, and for forcing said nut halves into the smaller end of said housing responsively to insertion of the bolt into the housing, respectively, fulfills the objectives of the invention as set forth above. Thus, rather than the spring means employed to spread the nut halves consisting of two springs opposing one another and with each being fixed to and controlled more or less exclusively by one nut half, the springs of the present invention are each reactive between the nut halves at the points symmetrically disposed with respect to the nut center line. Accordingly, the difficulties in effecting proper balance and symmetrical action of springs functioning to spread the nut halves which were encountered in the prior fasteners as aforesaid are completely overcome. Since the herein lever means for bringing the nut halves together also comprises a pair of spring levers, each bridging and acting on the two nut halves at points spaced equally from the nut center line, the problems heretofore encountered in balancing levers serving similar function but arranged so that each acts exclusively on one nut half, are similarly avoided. Finally, as compared to the spring ejection means employed in the fastener of my prior application aforesaid, the helical spring arranged with its free small-diameter end extending into the path of a bolt moving into the nut according to the present invention provides highly positive and uniformly effective bolt ejecting action.

As many changes could be made in carrying out the above constructions without departing from the scope of the invention, it is intended that all matter contained in the above description or shown in the accompanying drawings shall be interpreted as illustrative and not in a limiting sense.

I claim:

1. In a quick-acting bolt and nut fastener, a nut adapted to receive and threadedly secure a bolt comprising, in combination, a tapered housing having an axial bolt-receiving opening and two complementally tapered nut halves contained in the housing and being adapted to be brought together and to threadedly engage with the bolt when forced axially into the smaller end of the housing, spring means normally maintaining said nut halves spread in the larger end of the housing comprising a pair of double-leaf springs contained substantially in the larger diameter end of the housing and being disposed symmetrically to the sides of the nut center line, each spring extending transversely of the line of separation between the nut halves and the free ends of the leaves thereof being connected to said nut halves whereby each spring reacts equally and simultaneously on both said nut halves, and a pair of oppositely disposed lever means for forcing the nut halves into the smaller end of the housing as aforesaid responsively to insertion of the bolt into the housing, said pair of lever means being also contained within the larger diameter end of the shell and symmetrically to the sides of the nut center line, each said lever means comprising a bell-crank lever and means mounting said lever for pivotal movement about an axis extending transversely of the nut center line and which is so located as normally to position one lever arm in the path of entering movement of the bolt and the other arm in readiness to exert force in axial direction against the larger diameter end of its associated nut half, each said lever means also extending transversely of the line of separation between the nut halves so as to exert force equally and simultaneously on both said nut halves.

2. A nut for use in a quick-acting bolt and nut fastener as set forth in claim 1, wherein said springs comprise a knob-like body portion bridging the nut halves and depending legs which extend into the space between the nut halves.

3. A nut for use in a quick-acting bolt and nut fastener as set forth in claim 1, wherein said springs comprise a knob-like body portion bridging the nut halves and depending legs, said legs extending into the space between the nut halves and terminating in offset ends which seat in recesses provided in the diametral faces of said nut halves.

4. A nut for use in a quick-acting bolt and nut fastener as set forth in claim 3, wherein said knob-like body portion of each spring is connected to the legs through humps, and wherein said levers are each arranged so as to apply force to the nut halves through the humps of a spring.

5. A nut for use in a quick-acting bolt and nut fastener as set forth in claim 1, incorporating a helical spring mounted coaxially within the housing with its small diameter inner end normally extending into the space between the nut halves and being thereby disposed in the path of inserting movement of the bolt, whereby said spring is compressed in axial direction and stores up energy responsively to insertion of the bolt in the housing.

6. A nut for use in a quick-acting bolt and nut fastener as set forth in claim 1, wherein said double-leaf springs are physically separate one from the other.

7. A nut for use in a quick-acting bolt and nut fastener as set forth in claim 1, wherein said double-leaf springs are interconnected so as to form an assembly unit.

References Cited in the file of this patent

UNITED STATES PATENTS

| Number | Name | Date |
|---|---|---|
| 94,266 | Wright | Aug. 31, 1869 |
| 2,123,068 | Summers | July 5, 1938 |
| 2,489,613 | Beswick | Nov. 29, 1949 |
| 2,576,579 | Donovan | Nov. 27, 1951 |
| 2,631,348 | Bailey | Mar. 17, 1953 |